(12) United States Patent
 Trieb

(10) Patent No.: US 8,925,717 B2
(45) Date of Patent: Jan. 6, 2015

(54) CONVEYING INSTALLATION FOR TRANSPORTING BULK MATERIALS

(75) Inventor: Herbert Trieb, Lochau (AT)

(73) Assignee: Innova Patent GmbH, Wolfurt (AT)

( * ) Notice: Subject to any disclaimer, the term of this patent is extended or adjusted under 35 U.S.C. 154(b) by 32 days.

(21) Appl. No.: 13/555,366

(22) Filed: Jul. 23, 2012

(65) Prior Publication Data

US 2013/0032452 A1 Feb. 7, 2013

(30) Foreign Application Priority Data

Aug. 4, 2011 (AT) ................................ A 1131/2011

(51) Int. Cl.
 *B61B 7/06* (2006.01)
 *B65G 21/04* (2006.01)
(52) U.S. Cl.
 CPC .. *B61B 7/06* (2013.01); *B65G 21/04* (2013.01)
 USPC .......................................... 198/845; 198/699
(58) Field of Classification Search
 CPC ....................................................... B61B 7/06
 USPC .................... 198/838; 104/116, 112
 See application file for complete search history.

(56) References Cited

U.S. PATENT DOCUMENTS

| | | | | |
|---|---|---|---|---|
| 4,071,136 A * | 1/1978 | Jones | ............................ | 198/718 |
| 4,546,852 A * | 10/1985 | Martin et al. | ................... | 182/12 |
| 6,039,171 A * | 3/2000 | Trieb | ............................ | 198/699 |
| 7,562,767 B2 * | 7/2009 | Trieb | ............................ | 198/845 |
| 7,571,803 B2 * | 8/2009 | Trieb | ............................ | 198/845 |
| 7,628,267 B2 * | 12/2009 | Trieb | ............................ | 198/839 |
| 7,789,019 B2 * | 9/2010 | Kato | ............................ | 104/111 |
| 8,418,840 B2 * | 4/2013 | Trieb | ............................ | 198/845 |
| 2004/0168890 A1 * | 9/2004 | Trieb | ............................ | 198/827 |
| 2011/0067218 A1 * | 3/2011 | Kohler et al. | ................ | 29/426.2 |
| 2011/0180506 A1 * | 7/2011 | Lerchenmuller | ............. | 212/276 |
| 2012/0125876 A1 * | 5/2012 | Park et al. | ..................... | 212/312 |

* cited by examiner

*Primary Examiner* — Gene Crawford
*Assistant Examiner* — Thomas Randazzo
(74) *Attorney, Agent, or Firm* — Laurence A. Greenberg; Werner H. Stemer; Ralph E. Locher

(57) ABSTRACT

A conveying installation for transporting bulk materials has three pairs of carrying cables disposed one above the other. A continuous conveying belt can be moved along the central pair and the lower pair of carrying cables between loading and unloading stations, where it is guided over deflecting drums. Spaced-apart carrying frames hold the carrying cables. The installation includes a maintenance vehicle, which can be displaced along the two upper carrying cables and has on each side a maintenance platform, located laterally outside the carrying cables. The maintenance vehicle further has on at least one of the two sides a carrying framework, on which is located at least one drive subassembly for moving the maintenance vehicle. The drive subassembly is located laterally outside the carrying cables and beneath the undercarriage of the maintenance vehicle.

15 Claims, 5 Drawing Sheets

CONVEYING INSTALLATION FOR TRANSPORTING BULK MATERIALS

CROSS-REFERENCE TO RELATED APPLICATION

This application claims the priority, under 35 U.S.C. §119, of Austrian patent application A 1131/2011, filed Aug. 4, 2011; the prior application is herewith incorporated by reference in its entirety.

BACKGROUND OF THE INVENTION

Field of the Invention

The present invention relates to a conveying installation for transporting bulk materials, having three pairs of carrying cables located in each case more or less vertically one above the other, and having a continuous conveying belt, which can be moved on the central carrying cables, and on the lower carrying cables, between a loading station and an unloading station and is guided over deflecting drums in the loading station and in the unloading station, also having carrying frames, which are spaced apart from one another in the longitudinal direction of the conveying installation and by means of which the carrying cables are connected to one another, and having a maintenance vehicle, which can be displaced along the two upper carrying cables and has on its two sides in each case at least one maintenance platform, which is located laterally outside the carrying cables.

In the case of conveying installations for transporting bulk materials by means of a continuous conveying belt, it is known for these installations to be equipped with a maintenance vehicle which can be displaced along the conveying installation and by means of which the conveying installation can be inspected, maintained, and have repair work carried out, over its entire length.

In the case of such conveying installations for transporting bulk materials, the continuous conveying belt is displaced on the central carrying cables, and on the lower carrying cables, by means of carrying rollers and the maintenance vehicle is displaced on the upper pair of carrying cables by means of running wheels.

Known maintenance vehicles of this type comprise an undercarriage which is designed with running wheels, can be displaced on the upper carrying cables and is designed with at least one drive subassembly and with two maintenance platforms. The two maintenance platforms here are located on either side of the undercarriage, wherein they extend more or less over the entire height of the conveying installation. The at least one drive subassembly, which drives drive wheels provided on the maintenance vehicle, is located on the undercarriage in the region of the drive wheels. The drive wheels interact with a drive cable, which is also provided in the conveying installation and does not move in the conveying direction.

This known design of a maintenance vehicle, however, does not meet the technical requirements since its center of gravity, on account of the high weight of the at least one drive subassembly and of the comparatively low weight of the two lateral maintenance platforms, is located in its upper region, for which reason the maintenance vehicle does not have sufficient dimensional stability.

SUMMARY OF THE INVENTION

It is accordingly an object of the invention to provide a conveying installation which overcomes the above-mentioned disadvantages of the heretofore-known devices and methods of this general type and which provides for a conveying installation with a conveying belt, to design the maintenance vehicle so as to avoid the disadvantage of known maintenance vehicles which has been explained above.

With the foregoing and other objects in view there is provided, in accordance with the invention, a conveying installation for transporting bulk material, the conveying installation comprising:

three pairs of carrying cables disposed substantially vertically above one another, said pairs of carrying cables including lower carrying cables, central carrying cables, and upper carrying cables;

an endless conveying belt movably disposed along said central carrying cables and said lower carrying cables, between a loading station and an unloading station and guided over deflecting drums in the loading and unloading stations;

carrying frames disposed at a spacing distance from one another in a longitudinal direction of the conveying installation and connecting said carrying cables to one another;

a maintenance vehicle for displacement along said upper carrying cables, said maintenance vehicle having an undercarriage and at least one maintenance platform on each of two sides thereof disposed laterally outside said carrying cables, and said maintenance vehicle further having at least one carrying framework on at least one of the two sides, and at least one drive subassembly on said at least one carrying framework for moving said maintenance vehicle, said drive subassembly on said at least one carrying framework being located laterally outside said carrying cables and beneath said undercarriage of the maintenance vehicle.

In other words, the above objects are achieved according to the invention in that the maintenance vehicle has on at least one of the two sides, in addition, in each case at least one carrying framework, on which is located at least one drive subassembly for moving the maintenance vehicle, wherein the drive subassembly, which is arranged on the at least one carrying framework, is located laterally outside the carrying cables and beneath the undercarriage of the maintenance vehicle.

It is possible here for the at least one carrying framework for at least one drive subassembly to be located alongside one of the maintenance platforms, as seen in the movement direction of the maintenance vehicle. It is also possible for the at least one carrying framework for at least one drive subassembly to be located in the lower region of a maintenance platform.

The at least one carrying framework for at least one drive subassembly is preferably located alongside a maintenance platform, and at a distance therefrom, as seen in the movement direction of the maintenance vehicle. According to a further-preferred embodiment, the maintenance platforms and the at least one carrying framework for a drive subassembly, in their upper regions, are mounted on the undercarriage of the maintenance vehicle such that they can be pivoted about axes oriented at least more or less horizontally and transversely in relation to the carrying cables.

It is preferable for the at least one maintenance platform, located in each case on one side of the maintenance vehicle, and the at least one carrying framework for at least one drive subassembly to be spaced apart laterally from one another and to be connected to one another in an articulated manner via at least one strut.

According to a preferred embodiment, the at least one drive subassembly can drive at least one drive wheel, which is located on the maintenance vehicle and interacts with a drive cable, which is located in the conveying installation and extends along the carrying cables, in order to move the maintenance vehicle along the conveying installation. In particular, the drive cable wraps around at least one drive wheel, which is coupled to a drive subassembly. It is possible here to provide a plurality of drive wheels, which are driven by the at least one drive subassembly and have the drive cable wrapping around them.

Furthermore, preferably the conveying belt is designed with laterally arranged carrying rollers, which roll on the two central carrying cables and the two lower carrying cables, and the maintenance vehicle is designed with running rollers, which roll on the two upper carrying cables. It is possible here for the running rollers of the maintenance vehicle to be designed with a derailment guard.

According to a preferred embodiment, the at least one drive subassembly is formed by an internal combustion engine, which drives an oil pump, wherein the oil pump operates at least one oil motor, which is coupled for rotation to the at least one drive wheel. Preferably, furthermore, the maintenance vehicle is provided with at least one carrying bracket, which extends in the movement direction of the maintenance vehicle and on which the at least one oil motor is arranged.

In addition, preferably the at least one oil motor is secured against rotation in relation to the carrying bracket by means of a support which projects transversely from the oil motor, and has its remote end fastened on the carrying bracket.

Other features which are considered as characteristic for the invention are set forth in the appended claims.

Although the invention is illustrated and described herein as embodied in a conveying installation for transporting bulk materials, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
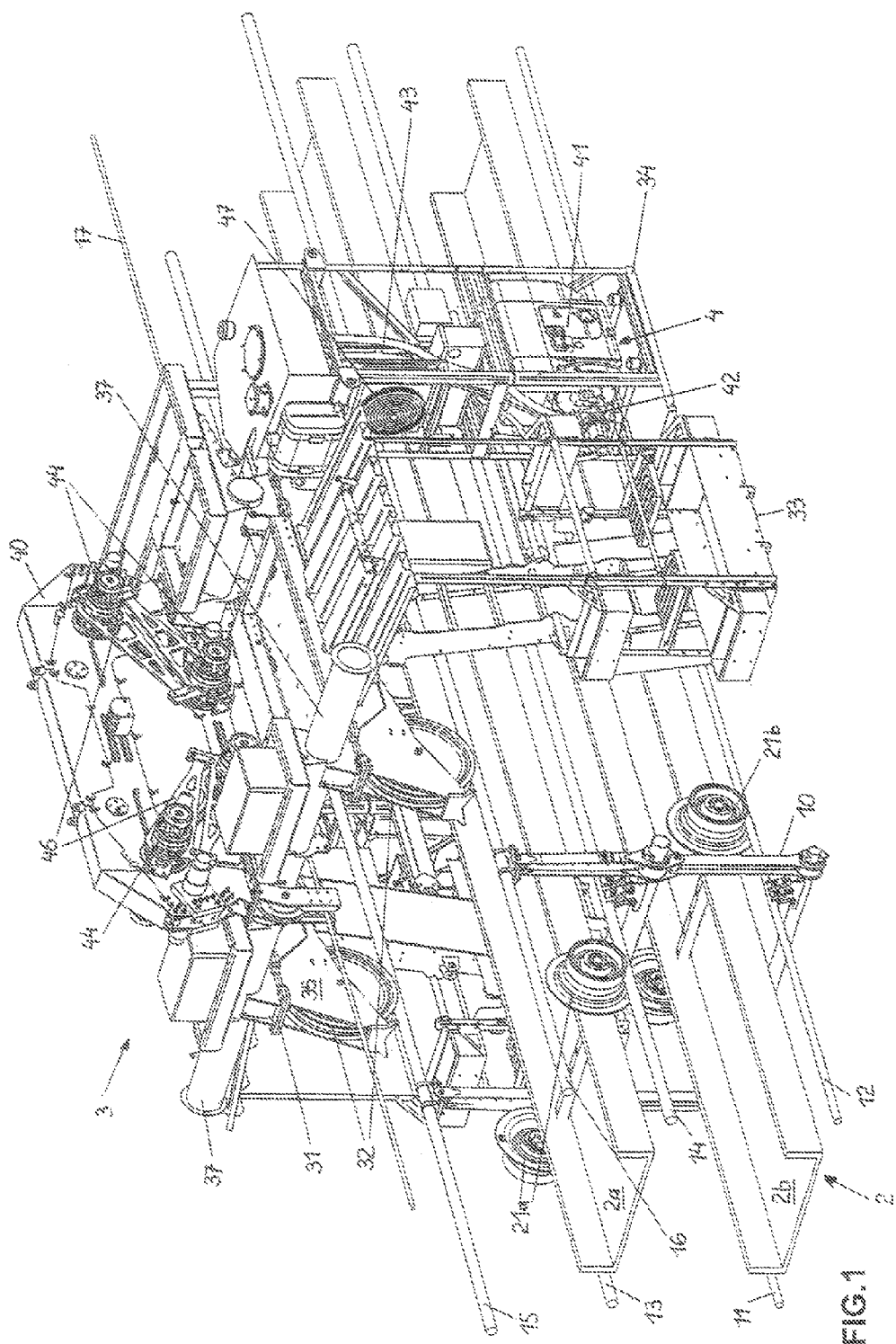
FIG. 1 shows an axonometric illustration of a portion of a conveying installation according to the invention with a maintenance vehicle.

Referring now to the figures of the drawing in detail, the figures illustrate a conveying installation for bulk materials that has three pairs of carrying cables 11 and 12, 13 and 14, 15 and 16, wherein a conveying belt 2, which is configured with a multiplicity of carrying rollers 21a and 21b, can be moved along the carrying cables 11 and 12 and 13 and 14. In the loading station and in the unloading station, the conveying belt 2 is guided over deflecting drums, of which at least one can be driven in order to move the conveying belt 2. Furthermore, a turning device is provided in each case downstream of the unloading station and upstream of the loading station, as seen in the movement direction of the lower strand 26 of the conveying belt 2, and causes the lower strand 2b of the conveying belt 2 to be turned upward downstream of the unloading station and be turned back again upstream of the loading station. As a result, the lower strand 2b of the conveying belt 2 moving back to the loading station is turned upward, and this prevents the situation where any material remaining thereon downstream of the unloading station falls downward.

The upper strand 2a of the conveying belt 2, which is loaded with a bulk material, is moved from the loading station to the unloading station, on the central carrying cables 13 and 14, by means of the carrying rollers 21a, which are mounted on said conveying belt. The turned-upward lower strand 2b of the conveying belt is moved back from the unloading station to the loading station by means of the carrying rollers 21b, which are mounted on said conveying belt and roll on the lower carrying cables 11 and 12. A maintenance vehicle 3 can be displaced along the upper carrying cables 15 and 16. Since the three pairs of carrying cables 11 to 16 are connected to one another by means of articulated carrying frames 10, the carrying cables 11 to 16 are stabilized in position in relation to one another.

The maintenance vehicle 3 has an undercarriage 31 provided with running rollers 32. The running rollers 32 can be displaced along the two upper carrying cables 15 and 16. On its two sides, the maintenance vehicle 3 has in each case one maintenance platform 33, these platforms being located laterally outside the carrying cables 11 to 16 and being of a height which corresponds at least to the distance between the upper carrying cables 15 and 16 and the lower carrying cables 11 and 12. Located laterally alongside the maintenance platforms 33 in each case is a carrying framework 34 for a drive subassembly 4, which serves for driving the maintenance vehicle 3. Each drive subassembly 4 is formed by an internal combustion engine 41, which drives an oil pump 42 in each case. Lines 43 lead from the oil pumps 42 to oil motors 44, which rotate drive wheels located on the undercarriage 31. A drive cable 17, which extends in the longitudinal direction of the conveying installation and does not move in the conveying direction of the installation, wraps around the drive wheels. Rotation of the drive wheels makes it possible for the maintenance vehicle 3 to be displaced along the upper carrying cables 15 and 16 by means of the running rollers 32. The running rollers 32 are designed with guard plates 35 serving as a derailment guard.

Figure 2:
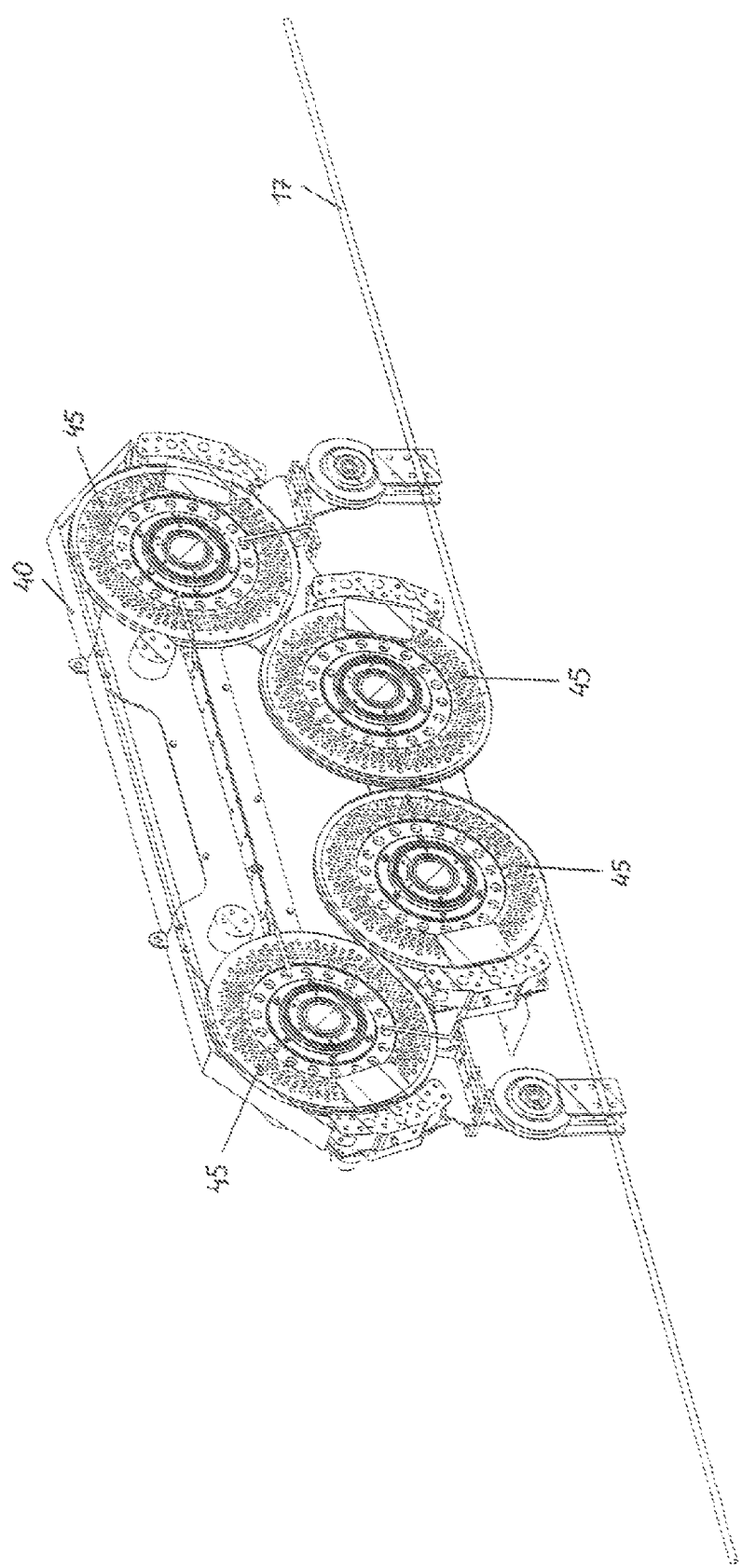
FIG. 2 shows a detail of the maintenance vehicle according to FIG. 1.
Figure 3:
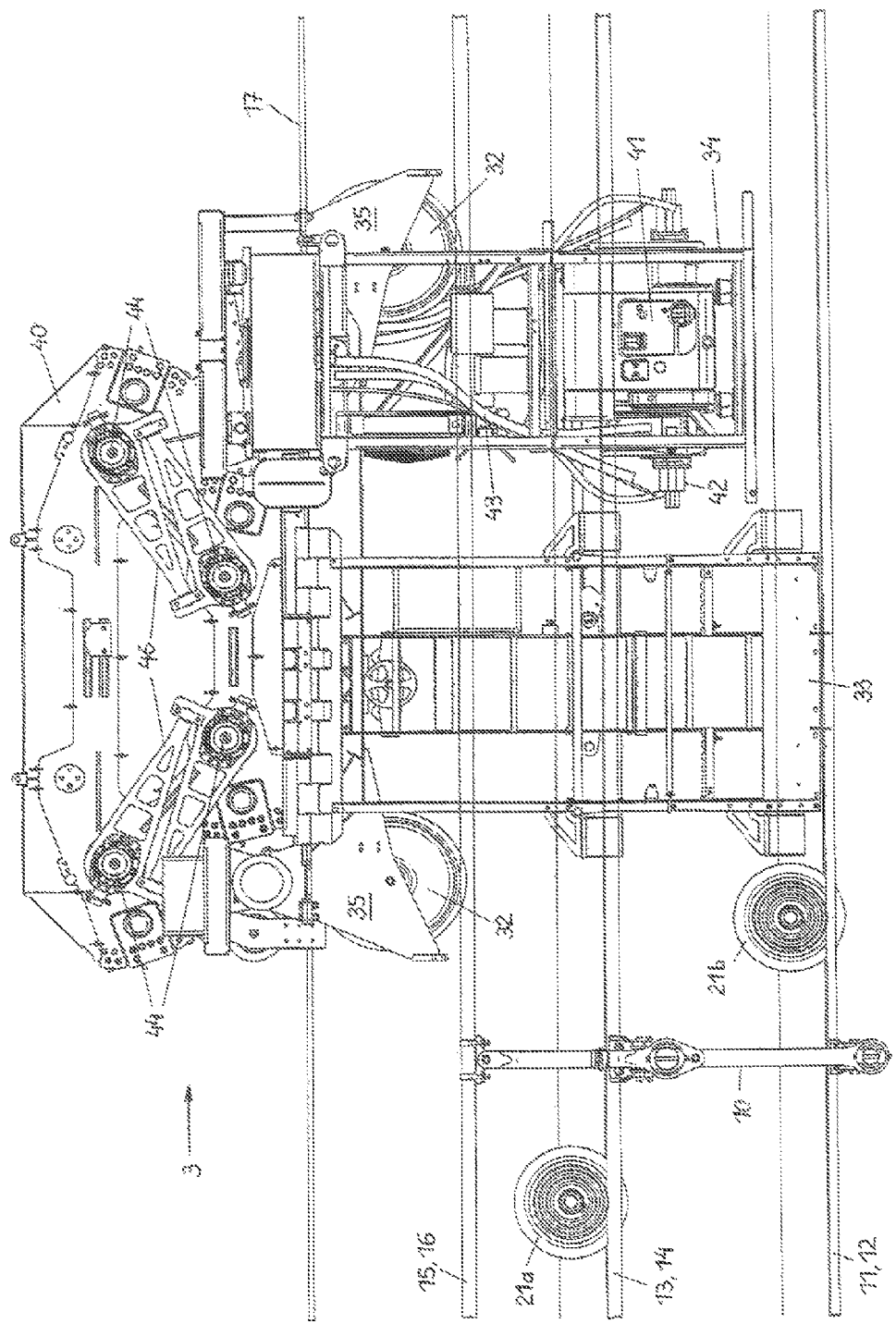
FIG. 3 shows a side view of the maintenance vehicle according to FIG. 1.
Figure 4:
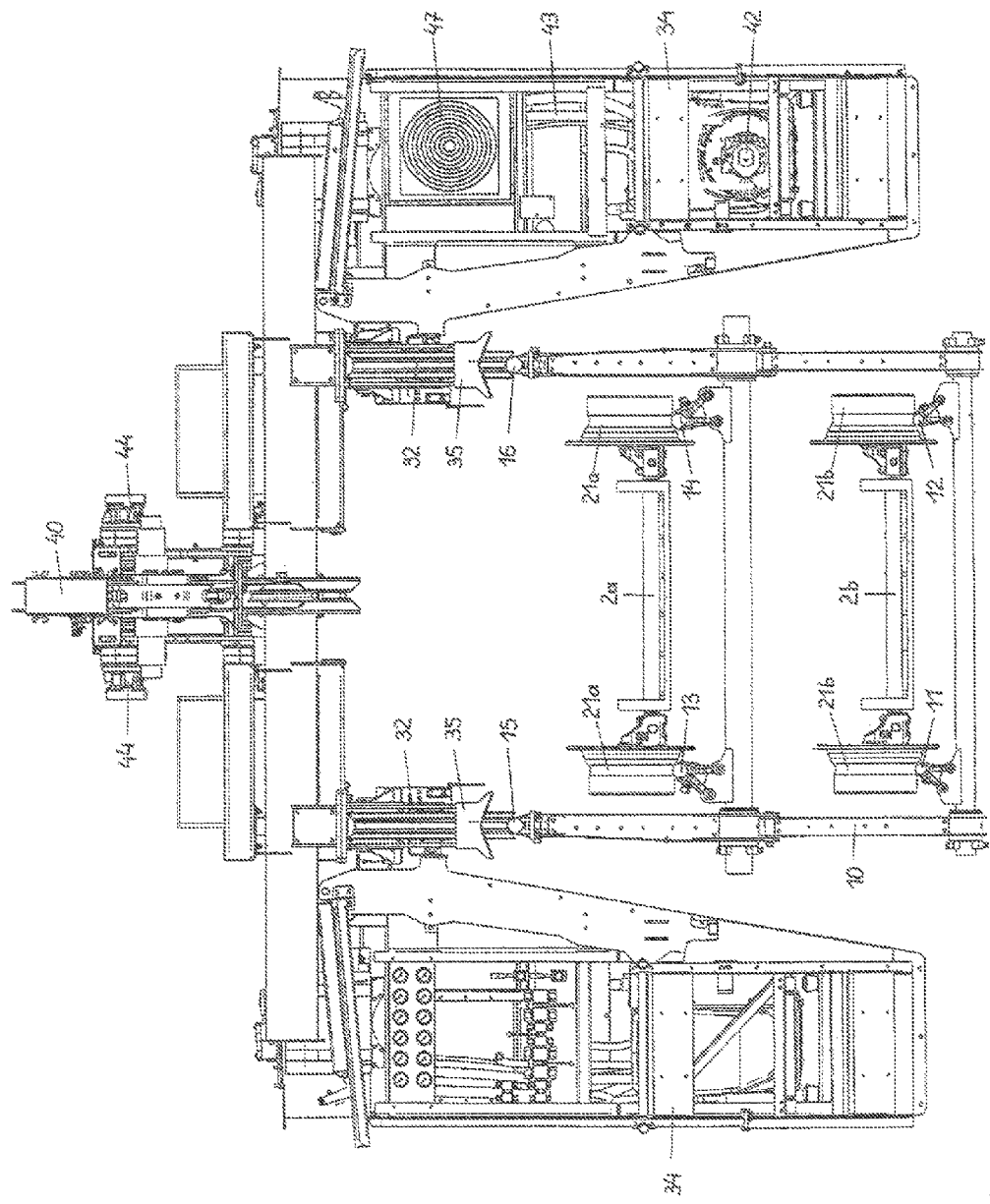
FIG. 4 shows a front view of the maintenance vehicle according to FIG. 1.
Figure 5:
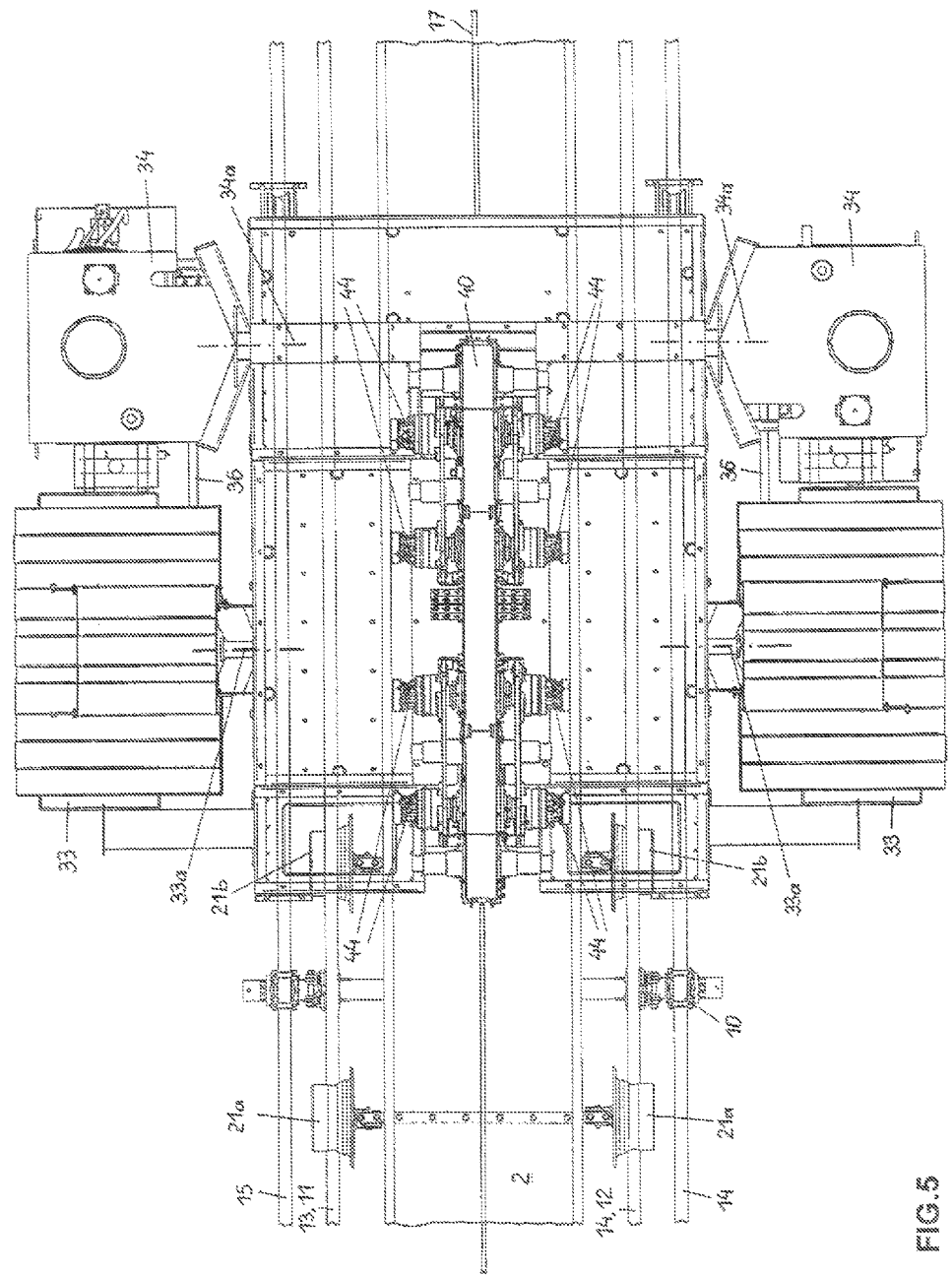
FIG. 5 shows a plan view of the maintenance vehicle according to FIG. 1.

FIG. 2 illustrates the drive cable 17 and four drive wheels 45, which are mounted on a carrying bracket 40 of the undercarriage 41 and are rotated by the oil motors 44. As can be seen therefrom, the drive wheels 45 are offset in relation to one another, on the one hand, in the movement direction of the maintenance vehicle 3 and, on the other hand, in respect of their heightwise positioning, wherein the drive cable 17 wraps around them in meandering form. This design ensures largely slippage-free coupling between the maintenance vehicle 3 and the drive cable 17.

The two maintenance platforms 33 are mounted on the undercarriage 31 along horizontally oriented first axes 33a. This means that the maintenance platforms 33, even in the case of the carrying cables 11 to 16 being inclined in relation to the horizontal, always assume a vertical position. In the same way, the carrying frameworks 34 for the drive subassemblies 4 are mounted on the undercarriage 31 such that they can be pivoted on horizontally oriented second axes 34a, and this means that, in the case of the carrying cables 11 to 16 being inclined, said carrying frameworks likewise assume a vertical position. The maintenance platforms 33 and the carrying frameworks 34 are spaced apart from one another by means of struts 36, which are articulated in a pivotable manner thereon.

The upper side of the undercarriage 31 is designed with the longitudinally extending carrying bracket 40, on which are located the oil motors 44, which rotate the drive wheels 45. The oil motors 44 are designed with transversely projecting torque supports 46, of which the ends remote from the oil motors 44 are fastened on the bracket 40, as a result of which the oil motors 44 are secured in respect of rotation. Oil-cooling devices 47 are provided in the circuit of the oil pumps 42 and oil motors 44. Furthermore, the maintenance vehicle is designed with carrying tubes 37, which form carrying devices for tools, equipment and the like required for maintenance or repair work and the like.

Since the drive subassemblies 4, which are arranged on the carrying frameworks 34 and have a very high weight, are located beneath the carrying cables 15 and 16 and beneath the running rollers 32, the center of gravity of the maintenance vehicle 3 is located well beneath the running rollers 32 of the maintenance vehicle 3, as a result of which the stability of the latter is considerably improved in relation to that of known maintenance vehicles.

The invention claimed is:

1. A conveying installation for transporting bulk material, the conveying installation comprising:
   three pairs of carrying cables disposed substantially vertically above one another, said pairs of carrying cables including lower carrying cables, central carrying cables, and upper carrying cables;
   an endless conveying belt movably disposed along said central carrying cables and said lower carrying cables, between a loading station and an unloading station and guided over deflecting drums in the loading and unloading stations;
   carrying frames disposed at a spacing distance from one another in a longitudinal direction of the conveying installation and connecting said carrying cables to one another;
   a maintenance vehicle for displacement along said upper carrying cables, said maintenance vehicle having an undercarriage and at least one maintenance platform on each of two sides thereof disposed laterally outside said carrying cables, and said maintenance vehicle further having at least one carrying framework on at least one of the two sides, and at least one drive subassembly on said at least one carrying framework for moving said maintenance vehicle, said drive subassembly on said at least one carrying framework being located laterally outside said carrying cables and beneath said undercarriage of the maintenance vehicle.

2. The conveying installation according to claim 1, wherein said at least one carrying framework for at least one drive subassembly is located alongside one of said maintenance platforms, as seen in a direction of movement of said maintenance vehicle.

3. The conveying installation according to claim 1, wherein said at least one carrying framework for said at least one drive subassembly is located in a lower region of a respective said maintenance platform.

4. The conveying installation according to claim 2, wherein said at least one carrying framework for at least one drive subassembly is located alongside a maintenance platform, and at a distance therefrom, as seen in a direction of movement of said maintenance vehicle.

5. The conveying installation according to claim 2, wherein said maintenance platforms and said at least one carrying framework for a drive subassembly, in upper regions thereof, are mounted on said undercarriage of said maintenance vehicle such that they can be pivoted about axes that are oriented substantially horizontally and transversely relative to said carrying cables.

6. The conveying installation according to claim 5, wherein each said at least one maintenance platform, located on each side of said maintenance vehicle, and said at least one carrying framework for said drive subassembly are spaced apart laterally from one another and connected to one another in an articulated manner via at least one strut.

7. The conveying installation according to claim 1, wherein said at least one drive subassembly is configured for driving at least one drive wheel rotatably mounted on said maintenance vehicle for interaction with a drive cable extending along said carrying cables, for moving said maintenance vehicle along the conveying installation.

8. The conveying installation according to claim 7, wherein said drive cable wraps around at least one drive wheel that is coupled to said drive subassembly.

9. The conveying installation according to claim 7, which comprises a plurality of drive wheels to be driven by said at least one drive subassembly, wherein said drive cable wraps around said drive wheels.

10. The conveying installation according to claim 1, wherein said conveying belt is configured with lateral carrying rollers disposed to roll on said two central carrying cables and said two lower carrying cables, and wherein said maintenance vehicle is configured with running rollers disposed to roll on said two upper carrying cables.

11. The conveying installation according to claim 10, wherein said running rollers of said maintenance vehicle are configured with a derailment guard.

12. The conveying installation according to claim 1, wherein said at least one drive subassembly is formed by an internal combustion engine for driving an oil pump, wherein said oil pump drives at least one oil motor that is coupled for rotation to said at least one drive wheel.

13. The conveying installation according to claim 12, wherein said maintenance vehicle includes at least one carrying bracket extending in a direction of movement of said maintenance vehicle and carrying said at least one oil motor.

14. The conveying installation according to claim 13, which comprises a support projecting transversely from said oil motor and having a remote end fastened on said carrying bracket, and wherein said at least one oil motor is secured against rotation relative to said carrying bracket by said support.

15. A conveying installation for transporting bulk material, the conveying installation comprising:
   three pairs of carrying cables disposed substantially vertically above one another, said pairs of carrying cables including lower carrying cables, central carrying cables, and upper carrying cables;
   an endless conveying belt movably disposed along said central carrying cables and said lower carrying cables, between a loading station and an unloading station and guided over deflecting drums in the loading and unloading stations;
   carrying frames disposed at a spacing distance from one another in a longitudinal direction of the conveying installation and connecting said carrying cables to one another; and
   a maintenance vehicle supported on said upper carrying cables and configured for displacement along said upper carrying cables and next to said endless conveying belt, said maintenance vehicle having:
an undercarriage laterally outside said carrying cables on each side of said endless conveying belt;
at least one maintenance platform supported on said undercarriage;
a drive subassembly configured for moving said maintenance vehicle along said carrying cables and next to said endless conveying belt, said drive subassembly being located laterally outside said carrying cables and beneath said undercarriage of the maintenance vehicle.

* * * * *